(12) United States Patent
Farooq et al.

(10) Patent No.: US 9,371,048 B2
(45) Date of Patent: Jun. 21, 2016

(54) ENERGY ABSORBING MEMBER FOR A BUMPER ASSEMBLY OF A VEHICLE

(71) Applicant: Ford Global Technologies, LLC, Dearborn, MI (US)

(72) Inventors: Iskander Farooq, Novi, MI (US); Mohammed Omar Faruque, Ann Arbor, MI (US); Dean M. Jaradi, Macomb, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/311,569

(22) Filed: Jun. 23, 2014

(65) Prior Publication Data

US 2015/0367796 A1 Dec. 24, 2015

(51) Int. Cl.
| | |
|---|---|
| *B60R 19/20* | (2006.01) |
| *B60R 19/03* | (2006.01) |
| *B60R 19/18* | (2006.01) |
| *B60R 19/22* | (2006.01) |
| *B60R 19/34* | (2006.01) |
| *B60R 21/017* | (2006.01) |
| *F16F 13/30* | (2006.01) |

(52) U.S. Cl.
CPC .................. *B60R 19/20* (2013.01); *B60R 19/03* (2013.01); *B60R 19/18* (2013.01); *B60R 19/22* (2013.01); *B60R 19/34* (2013.01); *B60R 21/017* (2013.01); *F16F 13/305* (2013.01); *B60R 2019/1873* (2013.01)

(58) Field of Classification Search
CPC ........ B60R 21/04; B60R 19/18; B60R 19/03; B60R 21/017; F16F 13/305

USPC .......................................................... 293/109
See application file for complete search history.

(56) References Cited

U.S. PATENT DOCUMENTS

| | | | | |
|---|---|---|---|---|
| 3,514,144 | A | * | 5/1970 | Alderfer ....................... 293/107 |
| 5,106,137 | A | * | 4/1992 | Curtis ........................... 293/107 |
| 5,646,613 | A | * | 7/1997 | Cho .............................. 340/903 |
| 6,053,664 | A | * | 4/2000 | Crane et al. ................... 405/215 |
| 6,736,434 | B2 | * | 5/2004 | Anderson et al. ............. 293/102 |
| 7,220,374 | B2 | * | 5/2007 | Zander et al. ................... 264/51 |
| 7,264,271 | B2 | * | 9/2007 | Barvosa-Carter et al. .... 280/751 |
| 7,461,877 | B2 | * | 12/2008 | Bailey ........................... 293/142 |
| 8,091,692 | B2 | | 1/2012 | Deshmukh et al. |
| 8,387,170 | B2 | * | 3/2013 | Green et al. ...................... 2/411 |
| 2005/0087410 | A1 | * | 4/2005 | Namuduri et al. .......... 188/267.2 |
| 2007/0107778 | A1 | * | 5/2007 | Bettin et al. ..................... 137/13 |
| 2013/0186473 | A1 | * | 7/2013 | Mankame ............. F15B 21/065 137/13 |

FOREIGN PATENT DOCUMENTS

| | | |
|---|---|---|
| DE | 102006026447 | 12/2007 |
| KR | 20130088265 | 8/2013 |
| WO | WO 9949236 | 9/1999 |
| WO | WO 02058963 | 8/2002 |
| WO | WO 2008044059 | 4/2008 |

* cited by examiner

*Primary Examiner* — Pinel Romain
(74) *Attorney, Agent, or Firm* — Jason Rogers; Bejin Bieneman PLC

(57) ABSTRACT

An energy absorbing member for a bumper assembly of a vehicle includes an open-celled foam. A magnetorheological fluid is disposed in the open-celled foam. A magnetic field source selectively controls a magnetic field in the open-celled foam. The open-celled foam includes cell walls and the magnetorheological fluid coats the cell walls and defines open cells unfilled by magnetorheological fluid.

18 Claims, 5 Drawing Sheets

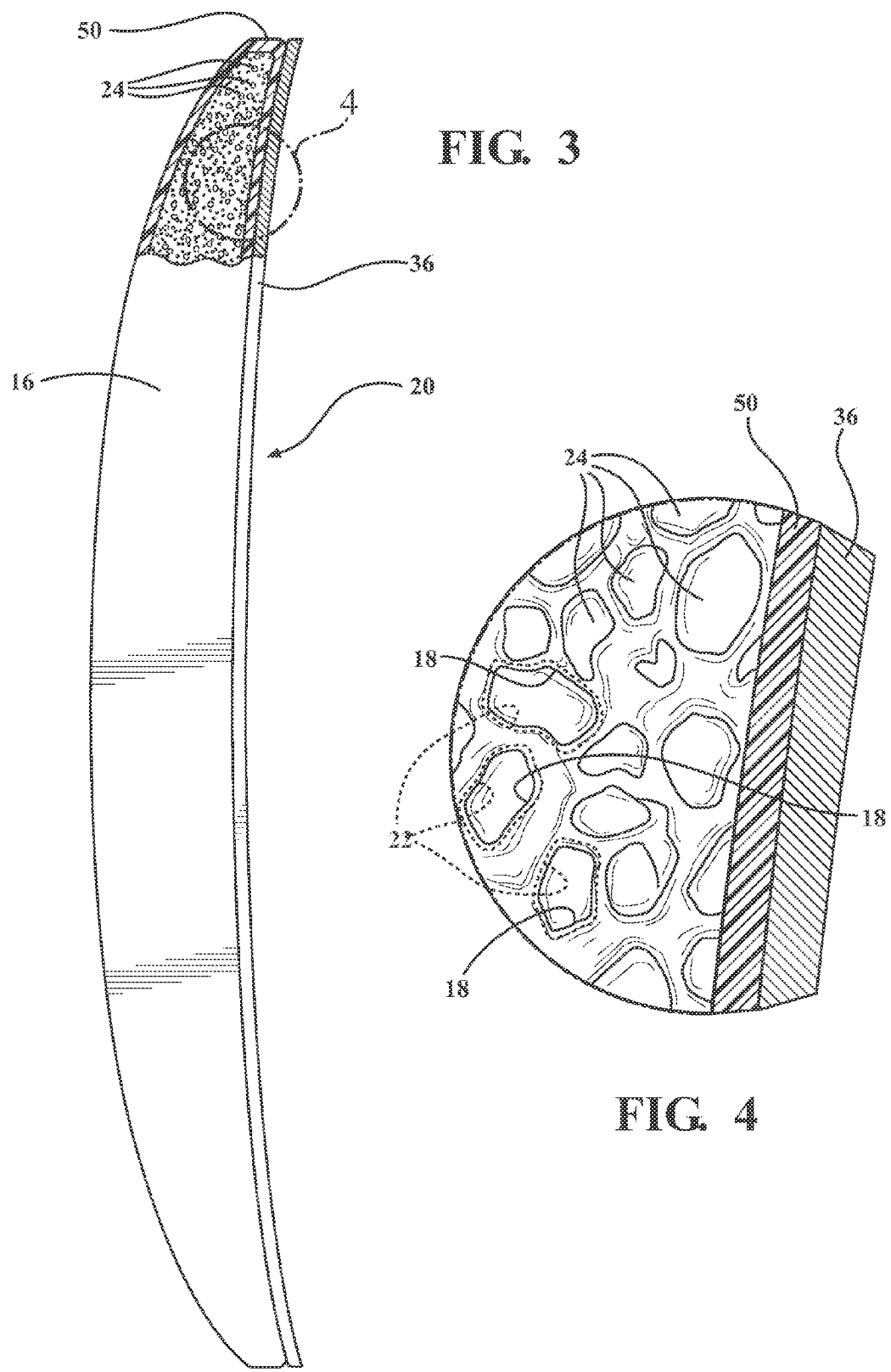

ENERGY ABSORBING MEMBER FOR A BUMPER ASSEMBLY OF A VEHICLE

BACKGROUND

A front structure of a vehicle includes a bumper assembly that is supported by a frame of the vehicle. The bumper assembly includes a bumper beam coupled to the frame of the vehicle and a fascia mounted to the bumper beam to provide an aesthetic show surface.

Bumper assemblies are designed to satisfy regulatory requirements and public domain testing involving front end impacts. As one example, vehicles are subjected to testing by the Insurance Institute for Highway Safety (IIHS) and bumper assemblies are, in part, designed to satisfy such testing. Regulatory requirements and public domain testing account for not only the safety of occupants inside the vehicle, such as during vehicle-to-vehicle impacts, but also account for pedestrians outside of the vehicle. These various tests can create conflicting requirements that complicate the design of the front structure.

One testing metric, for example, is directed toward the ability of the vehicle to remain undamaged during low speed impacts and is tested by the Low Speed Damageability (LSD) test. In the LSD test, the vehicle must withstand an impact with an object of a particular size at low speeds, e.g., below 30 kilometers per hour, without any visible damage to the vehicle, including the front bumper.

Other testing and requirements are directed toward protecting pedestrians. For example, testing in various countries requires that the front bumper be designed to reduce the likelihood of injury to the pedestrian during an impact of up to 50 kilometers per hour.

In order to accommodate the LSD test, bumper assemblies may be designed to be stiff to prevent damage to the exterior of the bumper assembly during a low speed impact. For example, an energy absorbing beam may be added to the bumper assembly inside the fascia to absorb energy during low speed impacts. On the other hand, bumper assemblies may be designed to be flexible to reduce the likelihood of injury to a pedestrian during impact with the pedestrian. As such, it is clear that these two tests impose conflicting demands on the design of bumper assemblies, i.e., one favoring a stiff bumper assembly and one favoring a soft bumper assembly, and complicate the design of the bumper assembly in order to accommodate both tests. Accordingly, there remains an opportunity to design a bumper assembly that addresses both of these tests.

BRIEF DESCRIPTION OF THE DRAWINGS

FIG. 3 is a bottom view of an energy absorbing member of the bumper assembly;

FIG. 4 is a magnified view of a portion of the cut-away section of FIG. 4;

DETAILED DESCRIPTION

Figure 2:
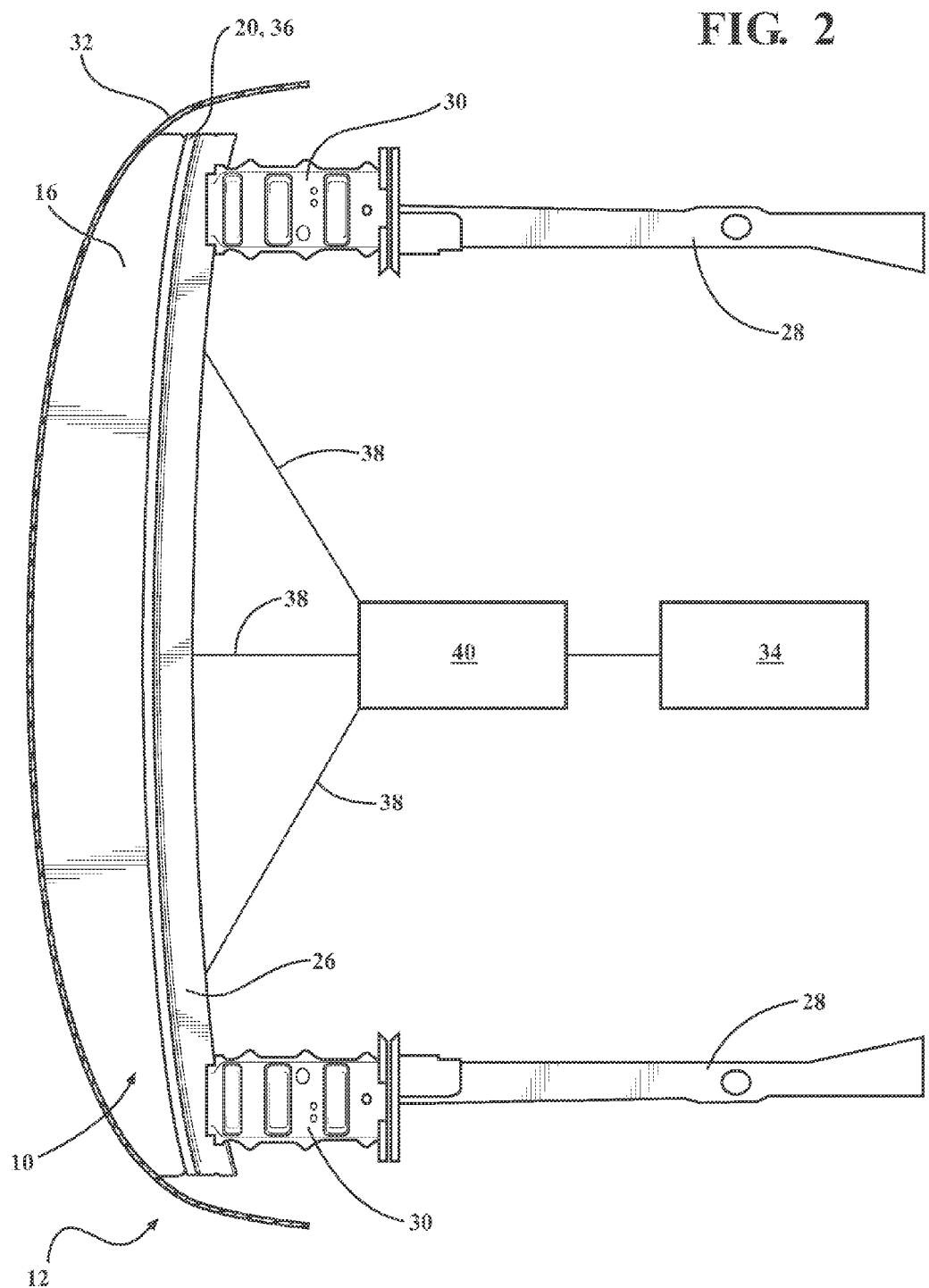
FIG. 2 is a bottom view of the bumper assembly connected to a controller and a power source of the vehicle.

With reference to the Figures, wherein like numerals indicate like parts throughout the several views, an energy absorbing member 10 for a bumper assembly 12 of a vehicle 14 is generally shown. With reference to FIGS. 2-4, the energy absorbing member 10 includes an open-celled foam 16. As shown in FIG. 4, a magnetorheological fluid 18 (hereinafter referred to as "MR fluid 18") is disposed in the open-celled foam 16. A magnetic field source 20 selectively controls a magnetic field in the open-celled foam 16. The open-celled foam 16 includes cell walls 22 and the MR fluid 18 coats the cell walls 22 inside the open-celled foam 16 and defines open cells 24 unfilled by MR fluid 18. It should be appreciated that, in FIG. 4, only three cell walls 22 are identified with hidden lines under the coating of MR fluid 18 merely for clarity of the drawings and that cell walls 22 surround each open cell 24 even when not identified with hidden lines in FIG. 4.

The open cells 24 between the cell walls 22 are not filled with MR fluid 18 (since the MR fluid 18 is drained from the open cells 24 leaving only a coating on the cell walls 22, as set forth further below) and thus are "open." Since the MR fluid 18 coats the cell walls 22 inside the open-celled foam 16 without filling the open cells 24, the amount (i.e., volume) of MR fluid 18 is reduced, which advantageously reduces the cost of the energy absorbing member 10. Rheological properties of the MR fluid 18, such as viscosity, plasticity, and elasticity, may be controlled by the intensity and location of the magnetic field in the open-celled foam 16. The stiffness of the energy absorbing member 10 may be varied by varying the magnetic field. Specifically, the energy absorbing member 10 can be stiffened by the application of a magnetic field and can be softened by reducing the strength of the magnetic field.

The magnetic field source 20 can change the magnetic field in the open-celled foam 16 to selectively control the MR fluid 18. Specifically, the magnetic field source 20 can increase the magnetic field to activate the MR fluid 18 to stiffen the open-celled foam 16. As set forth further below, the magnetic field source 20 may change the magnetic field based on the speed of the vehicle 14 to selectively stiffen/soften the energy absorbing member 10 based on speed of the vehicle 14. For example, the magnetic field can be increased when the vehicle 14 travels at low speeds, e.g., 0-30 KPH, to stiffen the energy absorbing member 10 to reduce the likelihood of damage to the bumper assembly 12 in the event of an impact at the low speed, i.e., to improve results of low-speed damageability tests. The magnetic field can be decreased or eliminated when the vehicle 14 travels at speeds at which pedestrian impacts are more likely to occur, e.g., between 30-50 KPH, to soften the energy absorbing member 10 to reduce the likelihood of injury to a pedestrian in the event of a pedestrian impact. The magnetic field, in other words, may be controlled based only on speed of the vehicle 14 regardless of whether an imminent impact is sensed, thus information regarding imminent impact is not required to adjust the stiffness of the bumper assembly 12. Thus, a pre-crash sensor system is not necessary to operate the energy absorbing member 10.

Figure 1:
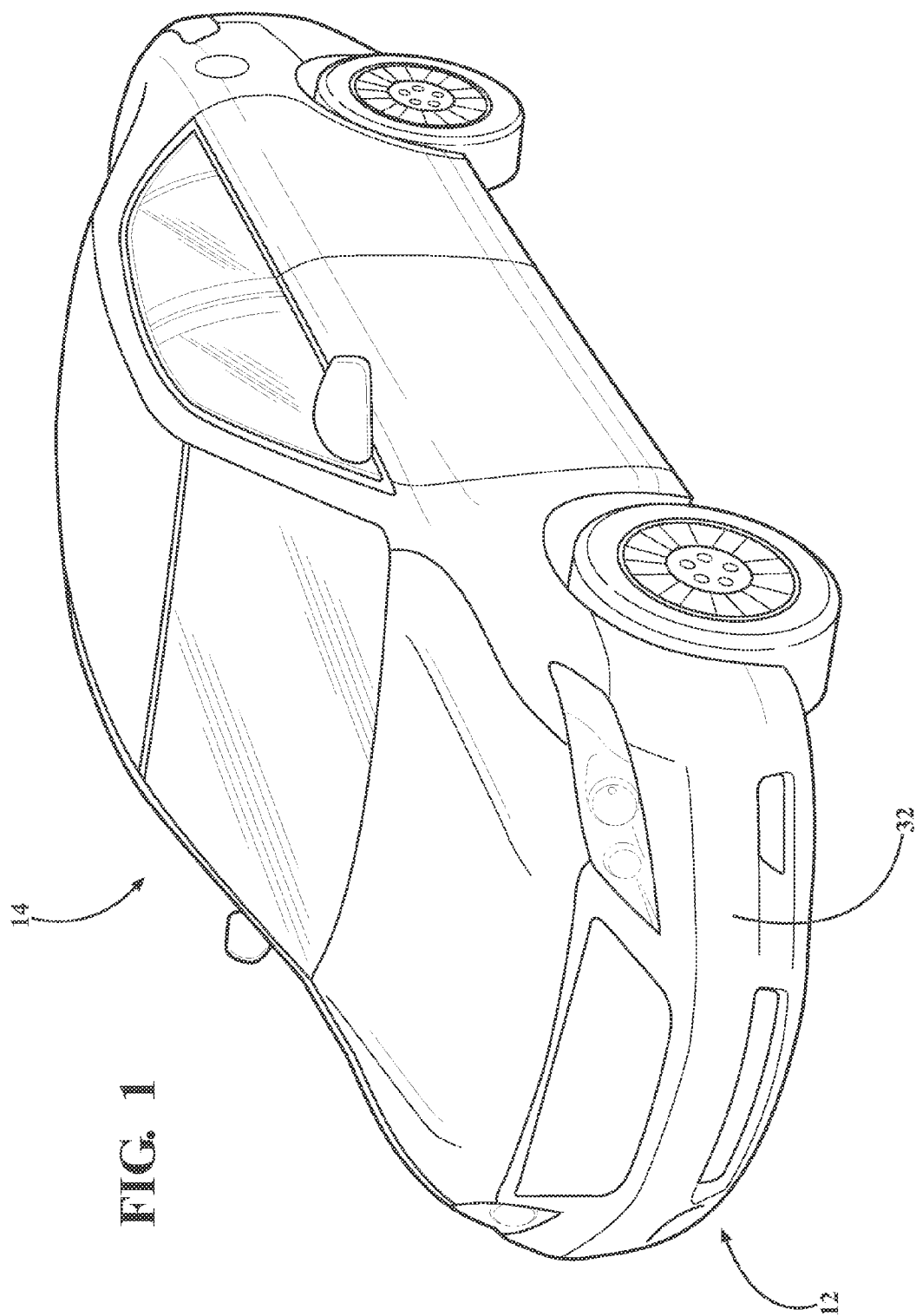
FIG. 1 is a perspective view of a vehicle including a bumper assembly.

With reference to FIGS. 1 and 2, the bumper assembly 12 is mounted to a front-end of the vehicle 14. As shown in FIG. 2, the bumper assembly 12 includes a bumper beam 26. The bumper beam 26 may be formed of metal.

The bumper assembly 12 includes, for example, arms 28 that engage the rest of the vehicle 14, e.g., a frame, sub-frame, etc., of the vehicle 14, to support the bumper beam 26 and the energy absorbing member 10. The bumper assembly 12 may include, for example, energy absorbing features, such as crush cans 30, between the arms 28 and the bumper beam 26.

The bumper assembly 12 includes a fascia 32. The fascia 32 may be supported by the bumper beam 26 and/or other components of the vehicle 14. As shown in FIG. 2, the energy absorbing member 10 may be disposed between the bumper beam 26 and the fascia 32.

The energy absorbing member 10 may be positioned to reinforce the fascia 32 during impact, e.g., to limit damage to the fascia 32 during low speed impacts and to limit pedestrian injuries during pedestrian impacts. The energy absorbing member 10 may directly contact an inner surface of the fascia 32. Alternatively, the energy absorbing member 10 may be spaced from the fascia 32, in which case an intermediate member may be disposed between the energy absorbing member 10 and the fascia 32.

The energy absorbing member 10 is coupled to the bumper beam 26. For example, the energy absorbing member 10 may be supported by the bumper beam 26. The energy absorbing member 10 may be fixed directly to the bumper beam 26.

The magnetic field source 20 may be disposed between the bumper beam 26 and the open-celled foam 16, as shown in FIG. 2. The magnetic field source 20 may be, for example, supported on the bumper beam 26 and may be fixed to the bumper beam 26. The magnetic field source 20 may be in direct contact with the open-celled foam 16. The magnetic field source 20, alternatively, may be embedded in the open-celled foam 16 in direct contact with the open-celled foam 16.

The magnetic field source 20 may be of any type for creating and controlling the magnetic field in the open-celled foam 16. As set forth below, the magnetic field source 20 may be connected to a power source 34 of the vehicle 14 and a controller 40 for controlling the power to the magnetic field source 20. The power source 34 may be, for example, a battery of the vehicle 14.

The magnetic field source 20 may be, for example, an electrically conductive plate 36 for connection to the power source 34 of the vehicle 14, as shown in FIGS. 2 and 3. One or more electrical leads 38 extend from the controller 40 to the electrically conductive plate 36 to selectively supply power to the electrically conductive plate 36. The flow of electricity through the electrically conductive plate 36 creates the magnetic field emanating from the electrically conductive plate 36 into the open-celled foam 16. As set forth above, the magnetic field activates the MR fluid 18.

A plurality of electrical leads may extend from the controller 40 to the electrically conductive plate 36, as shown in FIG. 2. In other words, the electrically conductive plate 36 is formed of an electrically conductive material. The intensity of the magnetic field at various locations along the electrically conductive plate 36 may be tuned with the selected number and placement of the connections between the electrical leads 38 and the electrically conductive plate 36. The magnetic field may be tuned to be a uniform intensity or a non-uniform intensity. Three electrical leads 38 are shown in FIG. 2 merely for the sake of example, and any suitable number of electrical leads 38 may connect the controller 40 to the magnetic field source 20

Figure 5:
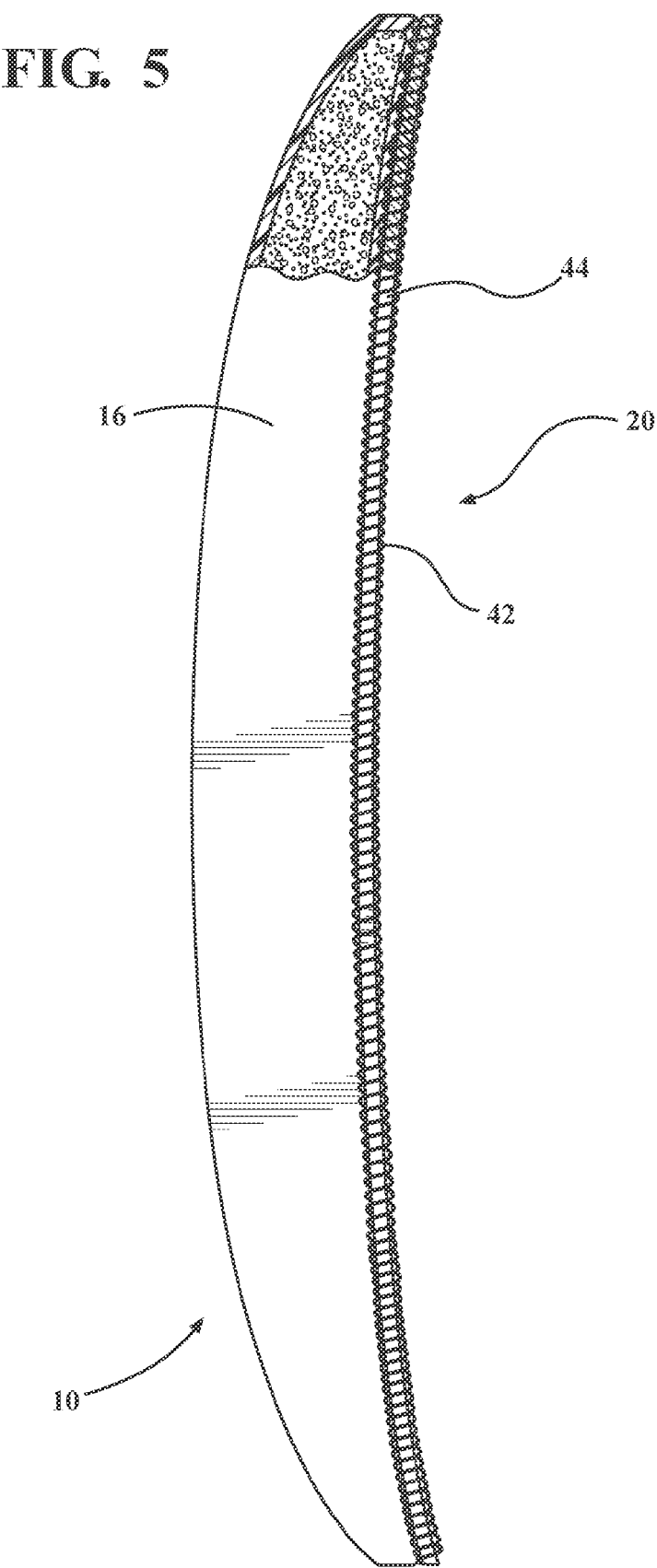
FIG. 5 is a bottom view of another embodiment of the energy absorbing member including a cut-away section showing magnetorheological fluid coating cell walls of the open-celled foam.

Alternatively, as shown in FIG. 5, the magnetic field source 20 is an electrically conductive coil 42 for connection to the power source 34 of the vehicle 14. In other words, the electrically conductive coil 42 is formed of an electrically conductive material. The flow of electricity through the electrically conductive coil 42 creates the magnetic field emanating from the electrically conductive coil 42 into the open-celled foam 16. As set forth above, the magnetic field activates the MR fluid 18. The conductive coil 42 may be wrapped around a ferromagnetic core 44. In other words, the conductive coil 42 and the ferromagnetic core 44 may form an electromagnet.

Figure 6:
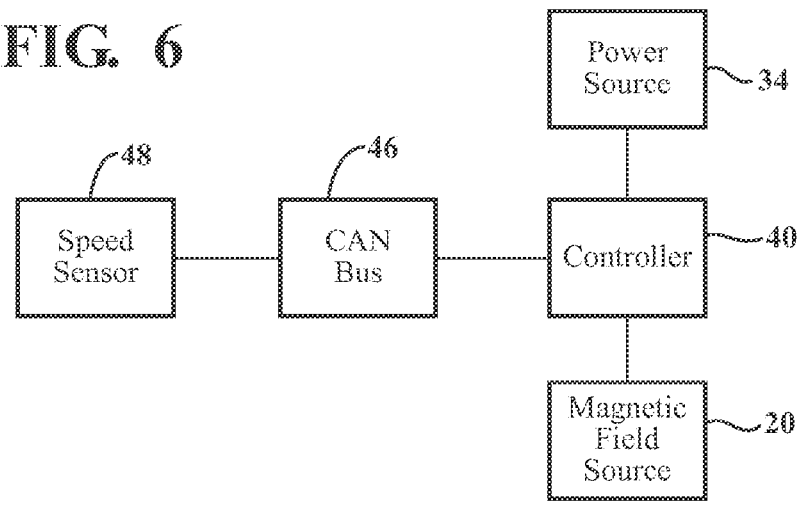
FIG. 6 is a schematic of a control system for controlling a magnetic field in open-celled foam of the energy absorbing member.

The controller 40 is in communication with power source 34 of the vehicle 14 and the magnetic field source 20 for controlling the magnetic field in the open-celled foam 16 based on the speed of the vehicle 14. In particular, as shown in FIG. 6, the controller 40 is connected to a controller area network (CAN) bus 46 of the vehicle 14. The CAN bus 46 includes data including the speed of the vehicle 14, i.e., the speed at which the vehicle 14 travels. The CAN bus 46 is connected, for example, to a speed sensor 48 of the vehicle 14 that measures the travelling speed of the vehicle 14.

The speed of the vehicle 14 is measured by the speed sensor 48 and communicated to the CAN bus 46. The controller 40 communicates with the CAN bus 46 to determine the speed of the vehicle 14 and thus control the power to the magnetic field source 20 accordingly. The controller 40, the CAN bus 46, and the speed sensor 48 may be of any suitable type.

As set forth above, with reference to FIGS. 3 and 4, the open-celled foam 16 includes open cells 24 defined between the cell walls 22 that are coated with MR fluid 18. The open cells 24 may be filled with, for example, air. Alternatively, the open cells 24 may be filled with any suitable gas or any suitable liquid other than the MR fluid 18. The open-celled foam 16 may be of any suitable type such as, for example, open-celled urethane, open-celled polyurethane, etc. The open cells 24 of the open-celled foam 16 may be of any suitable size and shape. The size and shape of the cells, the type of MR fluid 18, and the intensity and location of the magnetic field may affect the stiffness of the open-celled foam 16 when the MR fluid 18 is activated. Each of these factors may be appropriately designed to achieve the desired stiffness of the open-celled foam 16.

The open-celled foam 16 may be coupled to the magnetic field source 20. For example, the open-celled foam 16 may be fixed to the magnetic field source 20 with fasteners and/or other engagement features (not shown).

As shown in FIGS. 3-5, an impermeable layer 50 may be disposed on the open-celled foam 16 for retaining the MR fluid 18 in the open-celled foam 16. The impermeable layer 50 may hermetically seal the open-celled foam 16 to prevent evaporation of the MR fluid 18 from the open-celled foam 16. The impermeable layer 50 may extend around an entire exterior of the open-celled foam 16 to completely enclose the open-celled foam 16. In other words, in such an embodiment, no part of the open-celled foam 16 is exposed. The impermeable layer 50 may be, for example, a silicone coating. The silicone coating may be applied to the open-celled foam 16 by spraying.

The MR fluid 18 may be applied to the open-celled foam 16 by first immersing the open-celled foam 16 in the MR fluid 18 to fill the open cells 24 of the open-celled foam 16 and to bring the MR fluid 18 into contact with the cell walls 22. The open cells 24 may be in communication with each other so that the MR fluid 18 can flow throughout the open cells 24 to fill all open cells 24 in this stage. The MR fluid 18 is then drained from the open-celled foam 16 such that the cells of the open-celled foam 16 are open cells 24. When the MR fluid 18 is drained, a coating of MR fluid 18 remains on the cell walls 22 by surface tension. This coating may be referred to as a "boundary layer." The impermeable layer 50 may be applied to the open-celled foam 16 after the MR fluid 18 fills the open-celled foam 16 and is drained from the open-celled foam 16.

The MR fluid 18 may be of any suitable type. The MR fluid 18 may include, for example, nano-scale magnetizable particles (e.g., iron particles, etc.) in a carrier fluid.

Figure 7:
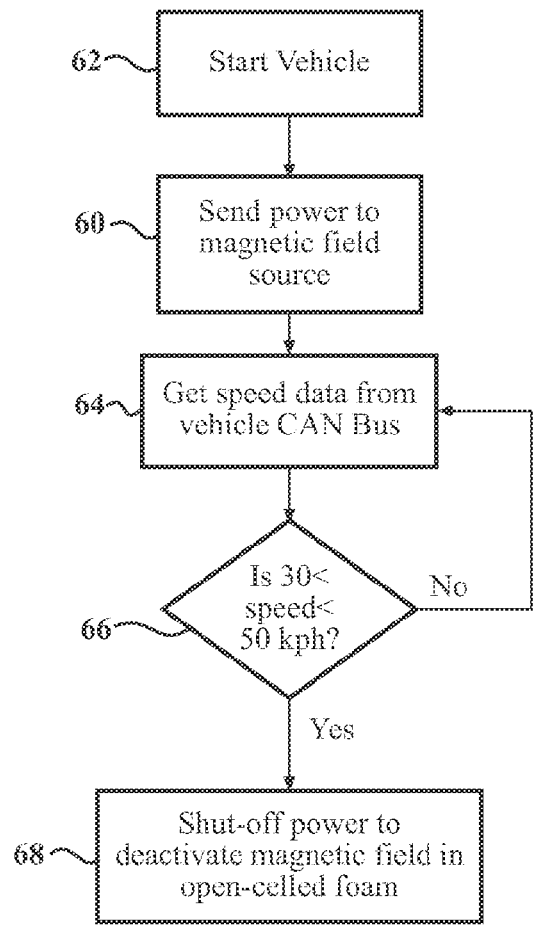
FIG. 7 is a flow chart showing a method of controlling the magnetic field in the open-celled foam.

A method of controlling a stiffness of an energy absorbing member 10 of a bumper assembly 12 of a vehicle 14 is shown in FIG. 7. The method includes applying a magnetic field to the MR fluid 18 in the open-celled foam 16 of the energy absorbing member 10. As shown in block 60 of FIG. 7, the magnetic field is applied to the open-celled foam 16 by applying power to the magnetic field source 20. Power may be applied when the vehicle is started, as shown in block 62.

The controller 40 increases power to the magnetic field source 20 to activate the magnetic field and stiffen the open-celled foam 16 and decreases or eliminates power to the magnetic field source 20 to deactivate the magnetic field to soften the open-celled foam 16. This activation and deactivation of the magnetic field may be based on the speed of the vehicle. When the magnetic field is deactivated, the open-celled foam 16 is more deformable for absorbing energy during an impact, i.e., provides a base stiffness.

The method includes monitoring the speed of the vehicle 14. Specifically, as set forth above, the CAN bus 46 of the vehicle 14 monitors the speed of the vehicle 14. Specifically, the speed sensor 48 measures the speed of the vehicle 14 and the speed of the vehicle 14 is communicated to the CAN bus 46, as shown in block 64.

The method includes varying the magnetic field based on changes in the speed of the vehicle 14. Specifically, as set forth above, the controller 40 is in communication with the CAN bus 46 and the magnetic field source 20 and the method includes controlling power to the magnetic field source 20 with the controller 40 to vary the magnetic field based on changes in the speed of the vehicle 14.

As shown in block 66 of FIG. 7, the speed of the vehicle is monitored to determine whether the speed of the vehicle is between 30 KPH and 50 KPH and, as shown in block 68, the magnetic field is deactivated when the speed of the vehicle 14 is between 30 KPH and 50 KPH. Specifically, the magnetic field may be activated when the vehicle 14 travels in a first activating speed range, e.g., between 0 and 30 kilometers per hour (KPH). By activating the magnetic field in this range, the open-celled foam 16 is stiffened, which reduces the likelihood of damage to the bumper assembly 12 in the event of a low speed impact, e.g., 0-30 KPH. In other words, the stiffening of the open-celled foam 16 improves results of low-speed damageability tests.

The magnetic field may be deactivated when the speed of the vehicle 14 is in a deactivating speed range, e.g., between 30 KPH and 50 KPH. By deactivating the magnetic field in this range, the open-celled foam 16 is softened, which reduces the likelihood of injury to a pedestrian in the event of an impact with the pedestrian. The magnetic field may be activated when the speed of the vehicle 14 exceeds a second activating speed, e.g., 50 KPH, to stiffen the open-celled foam 16 in the event of a high speed impact, i.e., impact over 50 KPH.

It should be appreciated that the ranges of 0-30 KPH, 30-50 KPH, and 50+ KPH are provided by way of example and the magnetic field may be activated, deactivated, or varied in intensity at any suitable speed or range of speeds without departing from the nature of the present invention. It should also be appreciated that the magnetic field may be activated to various intensities within the ranges discussed above. For example, the magnetic field may be gradually decreased as the vehicle 14 increases speed from 25 KPH to 30 KPH such that the magnetic field is completely deactivated when the vehicle 14 reaches 30 KPH. Conversely, the magnetic field may be gradually increased as the vehicle 14 decreases speed from 30 KPH to 25 KPH. Similarly, the magnetic field may be gradually increased as the vehicle 14 increases speed from 50 KPH to 55 KPH and, conversely, the magnetic field may be gradually decreased as the vehicle 14 decreases speed from 55 KPH to 50 KPH.

The disclosure has been described in an illustrative manner, and it is to be understood that the terminology which has been used is intended to be in the nature of words of description rather than of limitation. Many modifications and variations of the present disclosure are possible in light of the above teachings, and the invention may be practiced otherwise than as specifically described.

What is claimed is:

1. A bumper assembly for a vehicle, the bumper assembly comprising:
    a bumper beam;
    an energy absorbing member coupled to the bumper beam;
    the energy absorbing member including a magnetic field source, an open-celled foam, and a magnetorheological fluid disposed in the open-celled foam;
    the open-celled foam including cell walls and the magnetorheological fluid coating the cell walls and defining open cells unfilled by magnetorheological fluid; and
    a controller in communication with the magnetic field source for controlling a magnetic field in the open-celled foam based on a speed of the vehicle.

2. The bumper assembly as set forth in claim 1 wherein the magnetic field source is disposed between the bumper beam and the open-celled foam.

3. The bumper assembly as set forth in claim 1 wherein the magnetic field source is an electromagnet for connection to a power source of the vehicle.

4. The bumper assembly as set forth in claim 1 wherein the magnetic field source is an electrically conductive plate for connection to a power source of the vehicle.

5. The bumper assembly as set forth in claim 1 wherein the magnetic field source is an electrically conductive coil for connection to a power source of the vehicle.

6. The bumper assembly as set forth in claim 1 further comprising an impermeable layer on the open-celled foam for retaining the magnetorheological fluid in the open-celled foam.

7. The bumper assembly as set forth in claim 1 further comprising a fascia with the energy absorbing member disposed between the bumper beam and the fascia.

8. An energy absorbing member for a bumper assembly of a vehicle, the energy absorbing member comprising:
    an open-celled foam;
    a magnetorheological fluid disposed in the open-celled foam;
    a magnetic field source for selectively controlling a magnetic field in the open-celled foam;
    the open-celled foam including cell walls and the magnetorheological fluid coating the cell walls and defining open cells unfilled by magnetorheological fluid; and
    a controller in communication with the magnetic field source for controlling the magnetic field in the open-celled foam based on a speed of the vehicle.

9. The energy absorbing member as set forth in claim 8 wherein the magnetic field source is an electromagnet for connection to a power source of the vehicle.

10. The energy absorbing member as set forth in claim 8 further comprising an impermeable layer on the open-celled foam for retaining the magnetorheological fluid in the open-celled foam.

11. The energy absorbing member as set forth in claim 8 wherein the magnetic field source is an electromagnet for connection to a power source of the vehicle.

12. The energy absorbing member as set forth in claim 8 wherein the magnetic field source is an electrically conductive plate for connection to a power source of the vehicle.

13. The energy absorbing member as set forth in claim 8 wherein the magnetic field source is an electrically conductive coil for connection to a power source of the vehicle.

14. A method of controlling a stiffness of an energy absorbing member of a bumper assembly of a vehicle, the method comprising:
monitoring a speed of the vehicle;
providing a magnetic field to a magnetorheological fluid in a foam of the energy absorbing member; and
varying the magnetic field based on changes in the speed of the vehicle.

15. The method as set forth in claim 14 wherein a controller area network bus of the vehicle monitors the speed of the vehicle.

16. The method as set forth in claim 14 wherein a controller is in communication with the controller area network bus and the magnetic field source and further comprising controlling power to the magnetic field source with the controller to vary the magnetic field based on changes in the speed of the vehicle.

17. The method as set forth in claim 16 wherein the magnetic field source is an electrically conductive plate and further comprising varying power to the electrically conductive plate with the controller.

18. The method as set forth in claim 14 wherein the magnetic field is deactivated when the speed of the vehicle is between 30 kilometers per hour and 50 kilometers per hour.

* * * * *